(12) United States Patent
Takeishi

(10) Patent No.: US 12,292,775 B2
(45) Date of Patent: May 6, 2025

(54) ELECTRONIC APPARATUS, METHOD OF CONTROLLING THE SAME AND NON-TRANSITORY COMPUTER-READABLE STORAGE MEDIUM

(71) Applicant: CANON KABUSHIKI KAISHA, Tokyo (JP)

(72) Inventor: Masaki Takeishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 18/060,433

(22) Filed: Nov. 30, 2022

(65) Prior Publication Data

US 2023/0176642 A1    Jun. 8, 2023

(30) Foreign Application Priority Data

Dec. 2, 2021 (JP) .................................. 2021-196466

(51) Int. Cl.
*G06F 1/3234* (2019.01)
*G06F 1/3231* (2019.01)

(52) U.S. Cl.
CPC .......... *G06F 1/3231* (2013.01); *G06F 1/3265* (2013.01)

(58) Field of Classification Search
None
See application file for complete search history.

(56) References Cited

U.S. PATENT DOCUMENTS

| | | | |
|---|---|---|---|
| 6,202,162 B1* | 3/2001 | Katamoto | G06F 1/3228 713/323 |
| 2013/0162522 A1* | 6/2013 | Choi | G09G 5/00 345/156 |
| 2014/0035814 A1* | 2/2014 | de Lima | G06F 1/3265 345/158 |
| 2020/0391752 A1* | 12/2020 | Hagiwara | G06V 10/80 |

FOREIGN PATENT DOCUMENTS

| | | |
|---|---|---|
| JP | 2010004118 A | 1/2010 |
| JP | 2010271339 A | 12/2010 |
| JP | 2014142851 A | 8/2014 |
| JP | 2019179386 A | 10/2019 |

* cited by examiner

*Primary Examiner* — Paul Yen
(74) *Attorney, Agent, or Firm* — Canon U.S.A., Inc., IP Division

(57) ABSTRACT

An electronic apparatus including a display includes a facing-direction detection unit that detects a direction of a facing direction representing a direction in which a user of the electronic apparatus is facing, a line-of-sight detection unit that detects a line of sight direction of the user, a determination unit that, based on a detection result of the facing-direction detection unit and a detection result of the line-of-sight detection unit, determines whether to execute a normal mode indicating a normal drive state or a power saving mode where power consumption is less than in the normal mode, and a control unit that executes a mode based on a result of the determination of the determination unit.

7 Claims, 6 Drawing Sheets

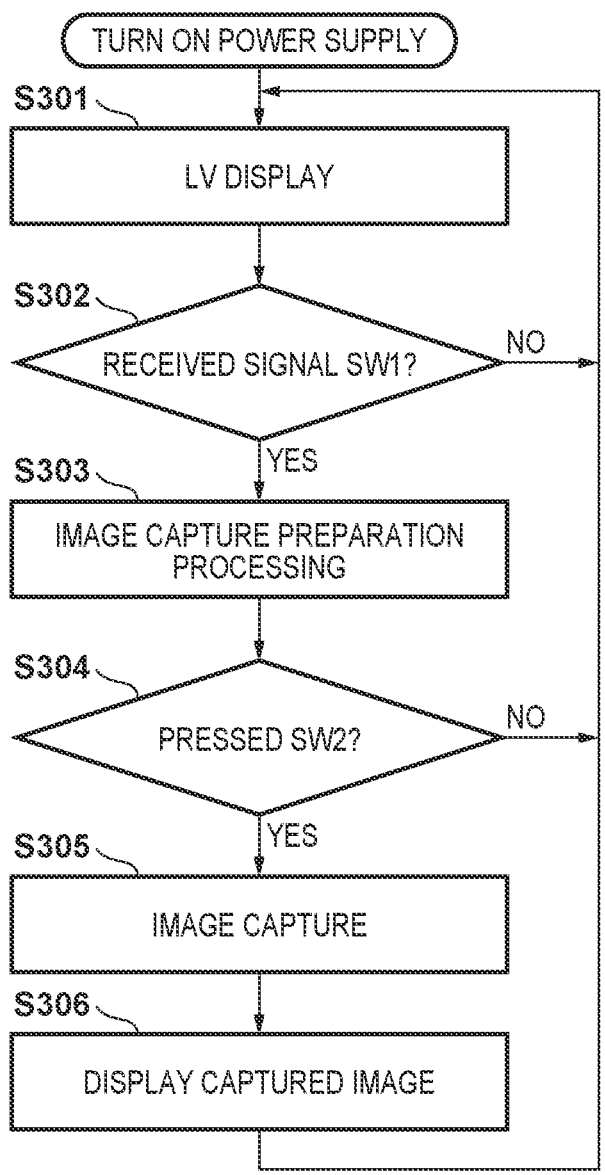

ELECTRONIC APPARATUS, METHOD OF CONTROLLING THE SAME AND NON-TRANSITORY COMPUTER-READABLE STORAGE MEDIUM

BACKGROUND

Field

The present disclosure relates to a technique for reducing power consumption in an electronic apparatus, and more particularly, in an electronic apparatus having a display that is looked at by a user.

Description of the Related Art

In order to prolong the battery life of an electronic apparatus such as a smartphone or a camera, it is ideal to infer the intention of the user to perform an operation and perform power-saving control when the user does not intend to perform an operation.

As a method of inferring operation intention, there is a method of detecting a direction of the user's face and a line of sight with respect to an electronic apparatus and determining operation intention based thereon.

A technique for detecting a line of sight or a facing direction representing a direction in which a user is facing has been studied. For example, Japanese Patent Laid-Open No. 2019-179386 (hereinafter, D1) discloses a technique for detecting the facing direction using a Time of Flight (ToF) sensor.

In addition, considering not only power-saving control but also utilization as a new user interface, various types of electronic apparatuses have appeared which include a device for detecting a line of sight of a user and a device for detecting a facing direction. However, when the detection device is constantly driven, there is a problem that the power consumption of the device increases.

In response to the above-described problem, Japanese Patent Laid-Open No. 2014-142851 (hereinafter, referred to as D2) discloses a technique of detecting camera shake of an electronic apparatus and peripheral light to control a power supply of a line of sight detection device and a face detection device.

However, in the above-mentioned D1, while the facing direction can be detected, it cannot be detected where the user is looking. Therefore, there are cases where it is not possible to accurately detect operation intention such as in a condition in which the facing direction is toward the electronic apparatus but the line of sight is toward another location.

In the above-mentioned D2, the power supply of the detection device is always turned on depending on the movement of the electronic apparatus and the brightness of the surroundings. Therefore, there are cases where it is not possible to solve the problem that the power consumption of the device increases depending on the surrounding situation.

SUMMARY

The present disclosure provides a technique for executing a power mode based on a degree of gaze on a display by a user in an electronic apparatus having a display.

According to an aspect of the present disclosure, an electronic apparatus including a display comprises a facing-direction detection unit configured to detect a direction of a facing direction representing a direction in which a user of the electronic apparatus is facing, a line-of-sight detection unit configured to detect a line of sight direction of the user; a determination unit configured to, based on a detection result of the facing-direction detection unit and a detection result of the line-of-sight detection unit, determine whether to execute a normal mode indicating a normal drive state or a power saving mode where power consumption is less than in the normal mode, and a control unit configured to execute a mode based on a result of the determination of the determination unit.

According to the present disclosure, it is possible to execute a power mode based on a degree of a gaze on the display by the user in the electronic apparatus having the display.

Further features of the present disclosure will become apparent from the following description of exemplary embodiments with reference to the attached drawings.

BRIEF DESCRIPTION OF THE DRAWINGS

FIG. 3 is a flowchart illustrating a processing procedure of the electronic apparatus.

DESCRIPTION OF THE EMBODIMENTS

Figure 1A:
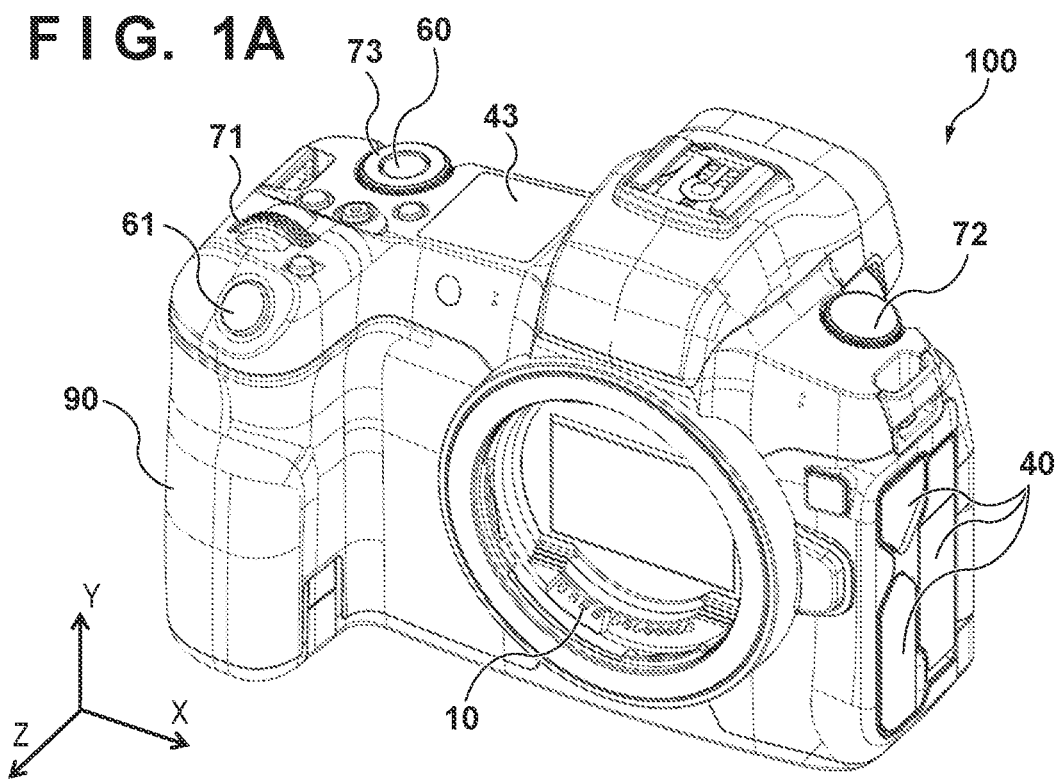
FIGS. 1A and 1B are external views of an electronic apparatus.

Hereinafter, embodiments will be described in detail with reference to the attached drawings. The following embodiments are not seen to be limiting. While multiple features are described in the embodiments, all features may not be required to implement the embodiments, and can be combined as appropriate. In the attached drawings, the same reference numerals are associated with the same or similar configurations, and redundant description thereof are omitted.

In the following description, a digital camera will be used for description purposes to describe the configuration and operation of an electronic apparatus according to the exemplary embodiments. While a digital camera is being provided for description purposes, any apparatus or device that would enable practice of the exemplary embodiments is applicable.

Figure 1B:
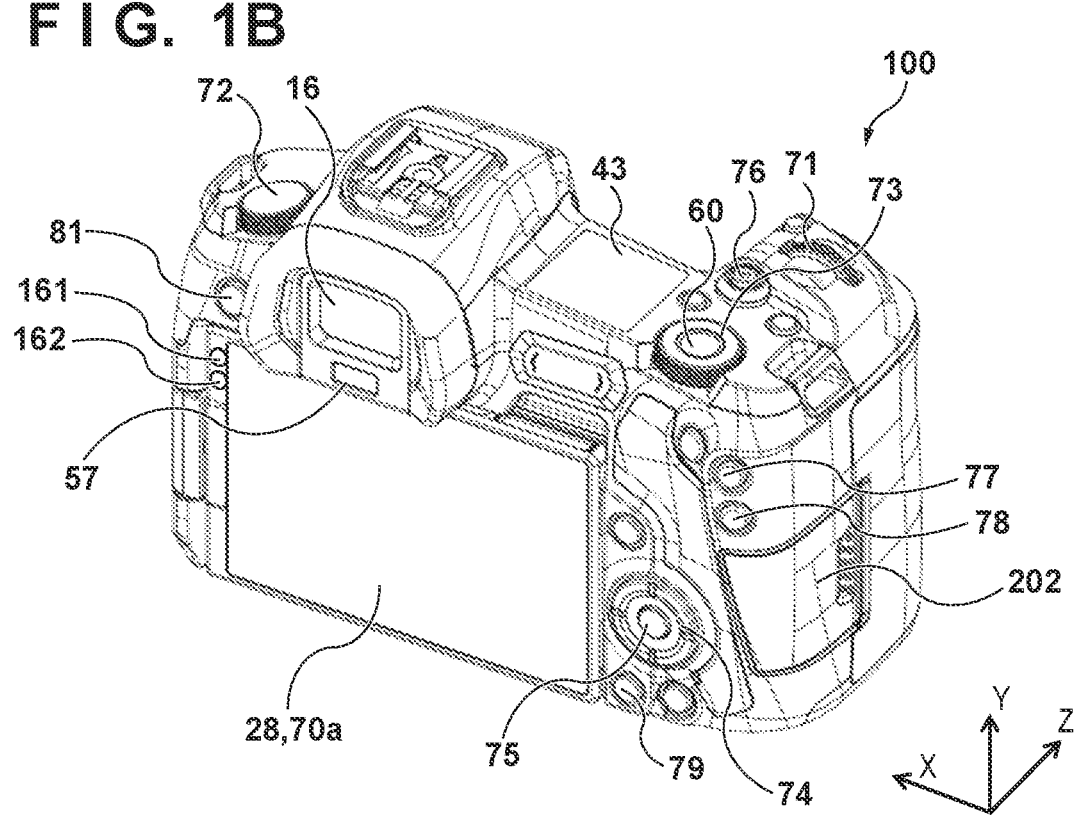

FIGS. 1A and 1B illustrate an external view of an electronic apparatus 100. FIG. 1A is a front perspective view of the electronic apparatus 100, while FIG. 1B is a rear perspective view of the electronic apparatus 100. In FIGS. 1A and 1B, a display 28 is a display provided on the back of the electronic apparatus 100 for displaying images and various types of information, such as for example, a menu screen. A touch panel 70a is provided on the display surface of the display 28, which enables a user to input an instruction to the electronic apparatus 100 via a touch operation on an item displayed on the display 28.

An out-of-finder display 43 is a display provided on the upper surface of the electronic apparatus 100, and displays various setting values of the electronic apparatus 100 such as a shutter speed and an aperture. A shutter button 61 is an operation unit for issuing an image capturing instruction. A mode changeover switch 60 is an operation unit for switching between various modes. A terminal cover 40 is a cover for protecting a connector (not illustrated) for connecting the electronic apparatus 100 to an external apparatus/device. Upon connection to an external apparatus/device, the terminal cover 40 is opened, and a cable (not illustrated) to connect with the external apparatus/device is connected to the connector. The connector includes a connecting terminal (not illustrated) of, for example, a USB cable and an output I/F 20, described below, which is an HDMI® output terminal.

A main electronic dial 71 is a rotary operation member included in an operation unit 70. Rotating the main electronic dial 71 provides for a setting value, such as a shutter speed and an aperture, to be changed. A power switch 72 is an operation member that switches the power of the electronic apparatus 100 ON and OFF. A sub electronic dial 73 is a rotary operation member included in the operation unit 70, and enables selection of frame movement, image feed, and the like. A cross key (four direction key) 74 is included in the operation unit 70, where each of the upper, lower, left, and right portions can pressed. A specific operation of the electronic apparatus 100 corresponding to a pressed portion of the cross key 74 can be provided. A SET button 75 is included in the operation unit 70 and is mainly used for determining selection items.

A moving image button 76 is used for instructions to start and stop moving image capturing (recording). An AE lock button 77 is included in the operation unit 70, and pressing the AE lock button 77 results in an image capture standby state, where, for example, the exposure state can be fixed. An enlargement button 78 is included in the operation unit 70, and is an operation button for turning ON or OFF an enlargement mode in a live-view display of the image capturing mode. Operating the main electronic dial 71 after turning ON the enlargement mode enables enlarging or reducing live view images. In the playback mode, the enlargement button 78 functions as an enlargement button for enlarging a reproduced image and increasing an enlargement ratio. A playback button 79 is included in the operation unit 70, and is an operation button for switching between an image capturing mode and a playback mode. When the playback button 79 is pressed during the image capturing mode, the mode transitions to the playback mode, and the newest image from among the images recorded on a recording medium 200 can be displayed on the display 28, an EVF 29, or an external device 210 (see FIG. 2).

A menu button 81 is included in the operation unit 70, and pressing the menu button 81 results in a menu screen where various settings can be made being displayed on the display 28, the EVF 29, or the external device 210. The user can intuitively perform various settings using the menu screen displayed on the display 28, the EVF 29, or the external device 210 and the cross key 74 and the SET button 75. A communication terminal 10 is a communication terminal enabling the electronic apparatus 100 to communicate with a lens unit 150 (detachable), as described below. An eyepiece unit 16 is an eyepiece unit of an eyepiece finder (a look-though type finder), where a user can visually recognize an image displayed on the internal EVF 29 via the eyepiece unit 16. An eye proximity detection unit 57 is an eye proximity detecting sensor that detects whether an eye of the user is near the eyepiece unit 16. A lid 202 is a lid for a slot in which the recording medium 200 is stored. A grip portion 90 is a holding portion that is shaped to be easily gripped by, for example, a user's right hand when the user holds the electronic apparatus 100. The shutter button 61 and the main electronic dial 71 are located at positions that can be operated by, for example, the user's right hand index finger in a state where the electronic apparatus 100 is held using the grip portion 90 with, for example, the user's pinky finger, ring finger, and middle finger of the user's right hand. In the same state, the sub electronic dial 73 is located at a position that can be operated by, for example, the user's thumb of the user's right hand.

Figure 2:
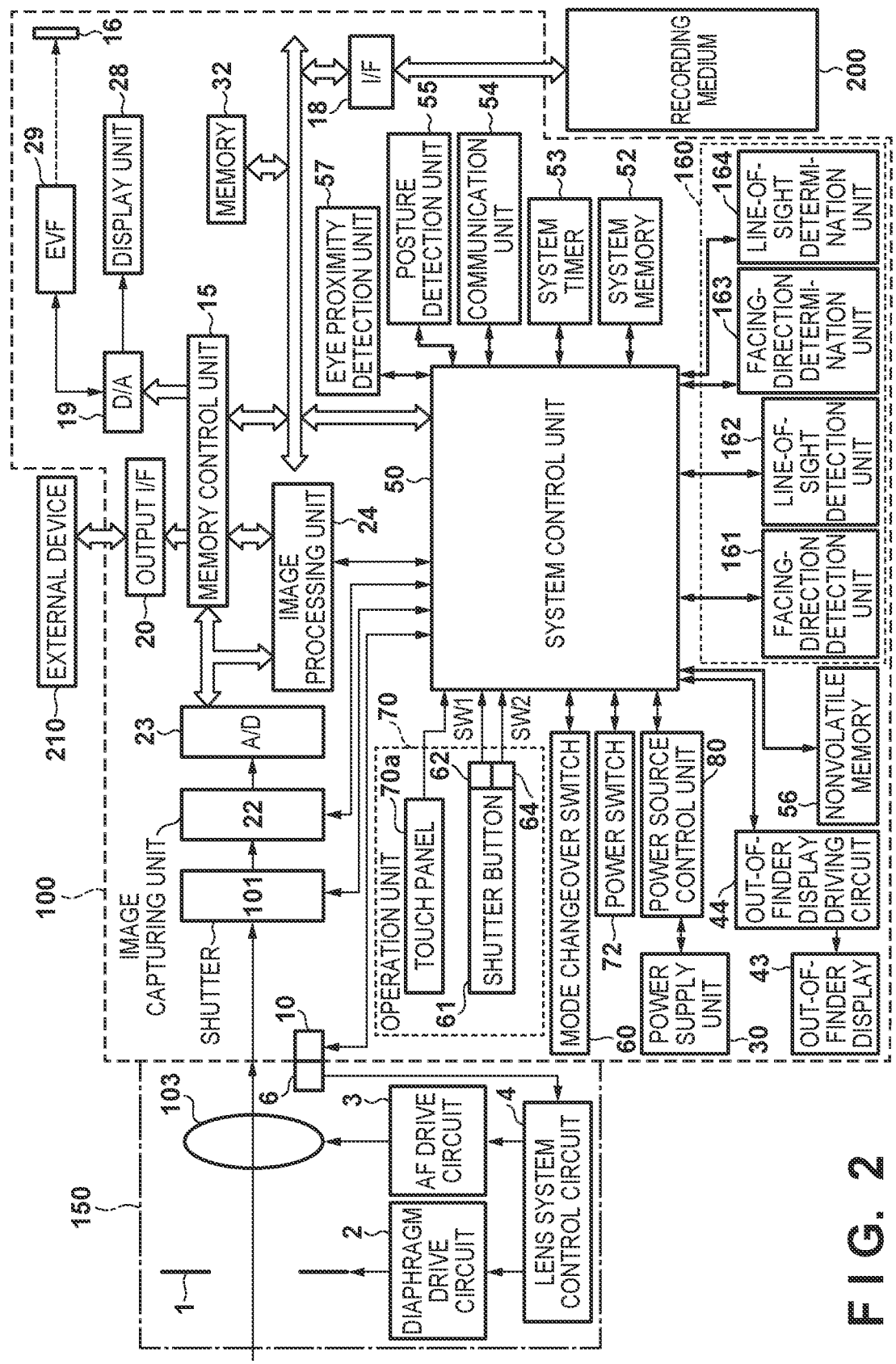
FIG. 2 is a schematic block diagram illustrating an example of a hardware configuration of the electronic apparatus.

FIG. 2 is a block diagram illustrating a configuration example of the electronic apparatus 100. In FIG. 2, the lens unit 150 is a lens unit on which an interchangeable image capturing lens is mounted. A lens 103 is typically composed of a plurality of lenses, but for simplicity, the lens 103 is illustrated here as a single lens. A communication terminal 6 is a communication terminal via which the lens unit 150 communicates with the electronic apparatus 100. The lens unit 150 controls a diaphragm 1 via a diaphragm drive circuit 2 via an internal lens system control circuit 4, and focuses by displacing the lens 103 via an AF drive circuit 3.

A shutter 101 is a focal plane shutter capable of freely controlling the exposure time of an image capturing unit 22 under the control of a system control unit 50.

The image capturing unit 22 is an image capturing element including a CCD, a CMOS device, or the like that converts an optical image into an electric signal. An A/D converter 23 is used to convert an analog signal of an image outputted from the image capturing unit 22 into digital image data.

An image processing unit 24 performs resizing processing such as predetermined pixel interpolation and reduction, and color-conversion processing on image data from the A/D converter 23 or image data from a memory control unit 15, which is described below. The image processing unit 24 performs predetermined calculation processing using captured image data. The system control unit 50, based on a calculation result obtained by the image processing unit 24, performs exposure control and distance measurement control. As a result, a through-the-lens (TTL) auto-focus (AF) process, an AE (auto-exposure) process, and an EF (flash pre-emission) process are performed. The image processing unit 24 also performs predetermined calculation processing using the captured image data, and performs TTL auto while balance (AWB) processing based on the obtained calculation result.

The memory control unit 15 controls data transmission and reception between the A/D converter 23, the image processing unit 24, and a memory 32. The image data outputted from the A/D converter 23 is directly written to the memory 32 via image processing unit 24 and the memory control unit 15 or via the memory control unit 15. The memory 32 stores digital image data obtained by the image capturing unit 22 and converted by the A/D converter 23, and image data to be displayed on the display 28, the EVF 29, or the external device 210. The memory 32 has a storage capacity sufficient to store a predetermined number of still images, and a predetermined length of moving images and sounds. The memory 32 also serves as a memory (video memory) for displaying images. A D/A converter 19 converts the image-display data stored in the memory 32 into an analog signal, and supplies the analog signal to the display 28 and the EVF 29. In this way, the image data for display written in the memory 32 is displayed by the display 28 and the EVF 29 via the D/A converter 19.

The display 28 and the EVF 29 perform a display on a display device such as an LCD or an organic EL based on an analog signal from the D/A converter 19. The output I/F 20 supplies the data for image display stored in the memory 32 to the external device 210 as a digital signal. This results in the image data for display written in the memory 32 being displayed on the external device 210. The data accumulated in the memory 32 that has been A/D converted by the A/D converter 23 is sequentially transferred to the display 28, the EVF 29, or the external device 210 for display, whereby live-view display (hereinafter, LV display) can be performed. Hereinafter, an image obtained by capturing by the image capturing unit 22, which is displayed as a live view, is referred to as a live view image or an LV image.

The out-of-finder display 43, via an out-of-finder display driving circuit 44, displays various setting values of the electronic apparatus 100 such as a shutter speed and an aperture.

A nonvolatile memory 56 is a memory on which data can be electrically erased and recorded. A Flash-ROM or the like is used as the nonvolatile memory 56. The nonvolatile memory 56 stores constants, programs, and the like for the operation of the system control unit 50. The programs are programs for executing the processing of the various flowcharts described below.

The system control unit 50 is a control unit including at least one processor or circuit, and controls the entire electronic apparatus 100. The system control unit 50 executes the above-described programs recorded in the nonvolatile memory 56 to realize respective processes. In a system memory 52, for example, a RAM is used, and constants, variables, programs read from the nonvolatile memory 56, and the like for operation of the system control unit 50 are loaded. In addition, the system control unit 50 also performs display control by controlling the memory 32, the display 28, the EVF 29, and the like.

A system timer 53 is a clock unit that measures the time used for various controls and the time of a built-in clock.

The mode changeover switch 60, a first shutter switch 62, a second shutter switch 64, and the operation unit 70 are enable inputting various operation instructions to the system control unit 50. The mode changeover switch 60 switches the operation mode of the system control unit 50 to a still image capturing mode, a moving image capturing mode, or the like. Examples of modes included in the still image capturing mode include an automatic image capturing mode, an automatic scene determination mode, a manual mode, an aperture priority mode (Av mode), a shutter speed priority mode (Tv mode), and a program AE mode (P mode). In addition, there are various scene modes, custom modes, and the like that are image capturing settings for each image capturing scene. The mode changeover switch 60 enables the user to switch directly to one of these modes. In another approach, after switching to a list screen of the image capturing modes by the mode changeover switch 60, any one of a plurality of displayed modes can be selected and the mode can be switched by using another operation member. Similarly, the moving image capturing mode can include a plurality of modes.

The first shutter switch 62 is turned ON when the shutter button 61 provided in the electronic apparatus 100 is partly operated, a so-called half-press (an image capture preparation instruction), and generates a first shutter switch signal SW1. In response to receiving the first shutter switch signal SW1, the system control unit 50 starts an image capture preparation operation such as an auto-focus (AF) process, an auto-exposure (AE) process, an auto-white balance (AWB) process, or a flash pre-emission (EF) process.

The second shutter switch 64 is turned ON when the shutter button 61 is completely operated, a so-called full-press (an image capturing instruction), and generates a second shutter switch signal SW2. In response to receiving the second shutter switch signal SW2, the system control unit 50 starts a series of image capturing processing operations that start with reading a signal from the image capturing unit 22 and end with writing a captured image into the recording medium 200 as an image file.

The operation unit 70 is a variety of operation members that function as an input unit for accepting operations from a user. The operation unit 70 includes at least the shutter button 61, the touch panel 70a, the main electronic dial 71, the power switch 72, the sub electronic dial 73, the cross key 74, the SET button 75, the moving image button 76, the AE lock button 77, the enlargement button 78, the playback button 79, the menu button 81, and the like.

A power supply control unit 80 includes a battery detection circuit, a DC-DC converter, a switching circuit for switching a block to be energized, and the like, and the power supply control unit 80 detects whether a battery is mounted, a type of a battery, and a remaining battery level. In addition, the power supply control unit 80 controls the DC-DC converter based on the detection result and an instruction from the system control unit 50, and supplies a required voltage to each unit including the recording medium 200 for a required period. A power supply unit 30 includes a primary battery such as an alkaline battery or a lithium battery, a secondary battery such as an NiCd battery, an NiMH battery, or an Li battery, an AC adapter, and the like.

An I/F 18 is an interface with the recording medium 200. The recording medium 200 is a removable recording medium such as a memory card for recording a captured image, and is composed of a semiconductor memory, a magnetic disk, or the like.

A communication unit 54 is connected by a wireless or wired cable, and transmits and receives video signals and audio signals. The communication unit 54 can also be connected to a wireless Local Area Network (LAN) or the Internet. In addition, the communication unit 54 can communicate with an external device via Bluetooth® or Bluetooth® Low Energy. The communication unit 54 can transmit an image (including an LV image) captured by the image capturing unit 22 and an image recorded on the recording medium 200, and can receive an image or various other types of information from an external device.

A posture detection unit 55 detects a posture of the electronic apparatus 100 with respect to gravitational direction. It is possible, based on the posture detected by the posture detection unit 55, to determine whether an image captured by the image capturing unit 22 is an image captured by holding the electronic apparatus 100 in landscape orientation or portrait orientation. The system control unit 50 can add direction information corresponding to the posture detected by the posture detection unit 55 to an image file of an image captured by the image capturing unit 22, or can rotate and record an image. An acceleration sensor, a gyro sensor, or the like can be used as the posture detection unit 55.

The eye proximity detection unit 57 is an eye proximity detecting sensor that detects (approach detection) the approach (eye proximity) and departure (eye departure) of an eye of the user with respect to the eyepiece unit 16 of the finder. The system control unit 50 switches the display (display drive state) and the non-display (non-display state) of the display 28 and the EVF 29 based on the state detected by the eye proximity detection unit 57. More specifically, at least in the case when in the image capture standby state and the switching of the display destination is automatic, the display is turned on with the display destination as the display 28 and the EVF 29 is not displayed while the eye is in proximity to the eyepiece unit 16. When the eye is in proximity, the display is turned on with the display destination as the EVF 29, and the display 28 is not displayed. The eye proximity detection unit 57 can use, for example, an infrared proximity sensor, and can detect the approach of an object towards the eyepiece unit 16 of the finder in which the EVF 29 is incorporated. When the object approaches, infrared rays projected from a light projecting unit (not shown) of the eye proximity detection unit 57 are reflected and received by a light receiving unit (not illustrated) of the infrared proximity sensor. Depending on the amount of received infrared rays, it is possible to determine the distance of the approaching object from the eyepiece unit 16 (eye proximity distance). As described above, the eye proximity detection unit 57 performs eye proximity detection to detect the proximity of the object to the eyepiece unit 16. In a case of detecting that an object has approached the eyepiece unit 16 to within a predetermined distance when in a state in which the eye was not in proximity (non-proximate state), it is detected that the eye is in proximity. When an object whose approach has been detected departs from the eye proximity state (proximate state) to a predetermined distance or more, it is detected as an eye departure. The threshold value for detecting eye proximity and the threshold value for detecting eye departure can be made to differ by employing hysteresis, for example. After eye proximity is detected, the eye proximity state is assumed until eye departure is detected. After eye departure is detected, a non-proximate state is assumed until eye proximity is detected. The infrared proximity sensor is only an example, and other sensors can be employed as the eye proximity detection unit 57 as long as the sensor can detect the approach of an eye or object to be treated as being in proximity.

The touch panel 70a and the display 28 can be integrated into a single component. For example, the touch panel 70a is configured so that the light transmittance does not interfere with the display of the display 28, and is attached to the upper layer of the display surface of the display 28. The input coordinates in the touch panel 70a are associated with the display coordinates on the display screen of the display 28. Thus, a graphical user interface (GUI) can be provided so the user can directly operate the screen displayed on the display 28.

A power-saving control unit 160 detects a degree of gaze on the display 28 by the user, and performs control to change the drive state and the power supply state of the electronic apparatus 100. The degree of the user's gaze on the display 28 is detected by detecting the direction of the user's face and the user's line of sight direction. In addition, control is performed to change the drive state or the power supply state of the device for detecting the facing direction and the line of sight.

A facing-direction detection unit 161 detects the direction of the face of the user. A facing-direction determination unit 161 calculates the angle of the facing direction of the user with respect to the display 28 from the detection result of the facing-direction detection unit 161, and determines whether the direction of the face is towards the display 28. The line-of-sight detection unit 162 detects the direction of the line of sight of the user. The line-of-sight determination unit 164 determines whether the line of sight is directed to the display 28 from the detection result of the line-of-sight detection unit 162. The system control unit 50 performs control to switch the state of the electronic apparatus 100 to the normal mode/power saving mode based on the determination results of the facing-direction determination unit 163 and the line-of-sight determination unit 164 of the power-saving control unit 160. To detect the line of sight and the facing direction with respect to the display 28 even when the display 28 has a movable configuration, the facing-direction detection unit 161 and the line-of-sight detection unit 162 can be located in the vicinity of the display 28. The facing-direction detection unit 161 and the line-of-sight detection unit 162 can be separate components or can be a single component.

A specific example of the facing-direction detection unit 161 and the line-of-sight detection unit 162 will now be described. The facing-direction detection unit 161 includes an image capturing element (not illustrated) installed in the vicinity of the display 28. The image capturing element only needs to be able to determine which of a predetermined number of directions corresponds to the direction of the face of the user. A monochrome image capturing element with a sufficient lower resolution than the image capturing element included in the main image capturing unit 22 is satisfactory. As a result, the amount of power consumption by the facing-direction detection unit 161 (and the image capturing element thereof) is much less than that of the main image capturing unit 22. The facing-direction detection unit 161, based on the image from the low-resolution image capturing element, generates and outputs information on the direction of the face from the outline of the face of the user and the location of parts such as eyes, eyebrows, a nose, and a mouth constituting the face. The facing-direction determination unit 163 determines, based on this information, which of several types of directions that are set in advance corresponds to the face of the user, and outputs the determined direction to the system control unit 50.

Both the facing-direction detection unit 161 and the facing-direction determination unit 163 use an image capturing element. It is assumed that the facing-direction detection unit 161 and the facing-direction determination unit 163 can select the facing direction and the frequency of detection and determination of the line of sight from two stages, and, for example, that a high drive state (a state in which a cycle is shorter) is an interval of 0.5 seconds and a low drive state (a state in which the cycle is long) is an interval of 1 second. The amount of power consumption is in the relationship of power off<low drive state<high drive state.

The image capturing element (not illustrated) of the line-of-sight detection unit 162 is installed in the vicinity of the display 28. The image capturing element is independent of the above-described image capturing element included in the facing-direction detection unit 161. The image capturing element included in the line-of-sight detection unit 162 only needs to determine which of a predetermined number of directions corresponds to the line of sight direction. It can be a monochrome image capturing element with sufficient lower resolution than the image capturing element included in the main image capturing unit 22. Therefore, the power consumption is much less than that of the main image capturing unit 22. The line-of-sight detection unit 162 outputs information indicating the user's line of sight direction from the location of the parts of the user based on the image from the low-resolution image capturing element. The line-of-sight determination unit 164 determines, based on this information, which of several types of directions that are set in advance corresponds to the line of sight of the user, and outputs the determined direction to the system control unit 50. The line-of-sight detection unit 162 and the line-of-sight determination unit 164 operate with a line of sight direction detection and determination frequency per unit time using the image capturing element as one of three types: a high drive state (line of sight direction detection interval of 0.5 seconds, for example), a low drive state (line of sight direction detection interval of 1 second, for example), and power-off (no detection). The amount of power consumption is in the relationship of power off<low drive state<high drive state.

FIG. 3 illustrates a series of flow of control from standby to image capture while the electronic apparatus 100 is powered on. The processing of the system control unit 50 will now be described with reference to FIG. 3.

When the electronic apparatus 100 is activated, in step S301, the system control unit 50 displays the LV on the display 28 or the EVF 29. In step S302, the system control unit 50 determines whether the shutter switch signal SW1 is received from the first shutter switch 62. That is, the system control unit 50 determines whether the user has performed an operation of half-pressing the shutter button 61. If it is determined that the shutter switch signal SW1 has not been received, the system control unit 50 returns the process to step S301. If it is determined that the shutter switch signal SW1 has been received (the user has performed a half-press operation on the shutter button 61), the system control unit 50 advances the process to step S303.

In step S303, the system control unit 50 performs a preparation operation prior to image capturing, such as an AF process. Then, the system control unit 50 advances the process to step S304.

In step S304, the system control unit 50 determines whether the shutter switch signal SW2 is received. That is, the system control unit 50 determines whether the user has performed an operation of full-pressing the shutter button 61. If it is determined that the shutter switch signal SW2 has not been received, the system control unit 50 returns the process to step S301. If it is determined that the shutter switch signal SW2 has been received (the user has performed a full-press operation on the shutter button 61), the system control unit 50 advances the process to step S305.

In step S305, the system control unit 50 performs an image capturing operation, reads a signal from the image capturing unit 22, and writes the captured image as an image file to the recording medium 200. Then, in step S306, the system control unit 50 displays an image obtained by the current image capture on the display 28 or the EVF 29 for a predetermined period of time, and then returns the process to step S301. As described above, while the electronic apparatus 100 is on, LV displaying and image capture are repeated.

The above is the configuration of the electronic apparatus 100 (digital camera) and the image capturing processing.

Figure 4A:
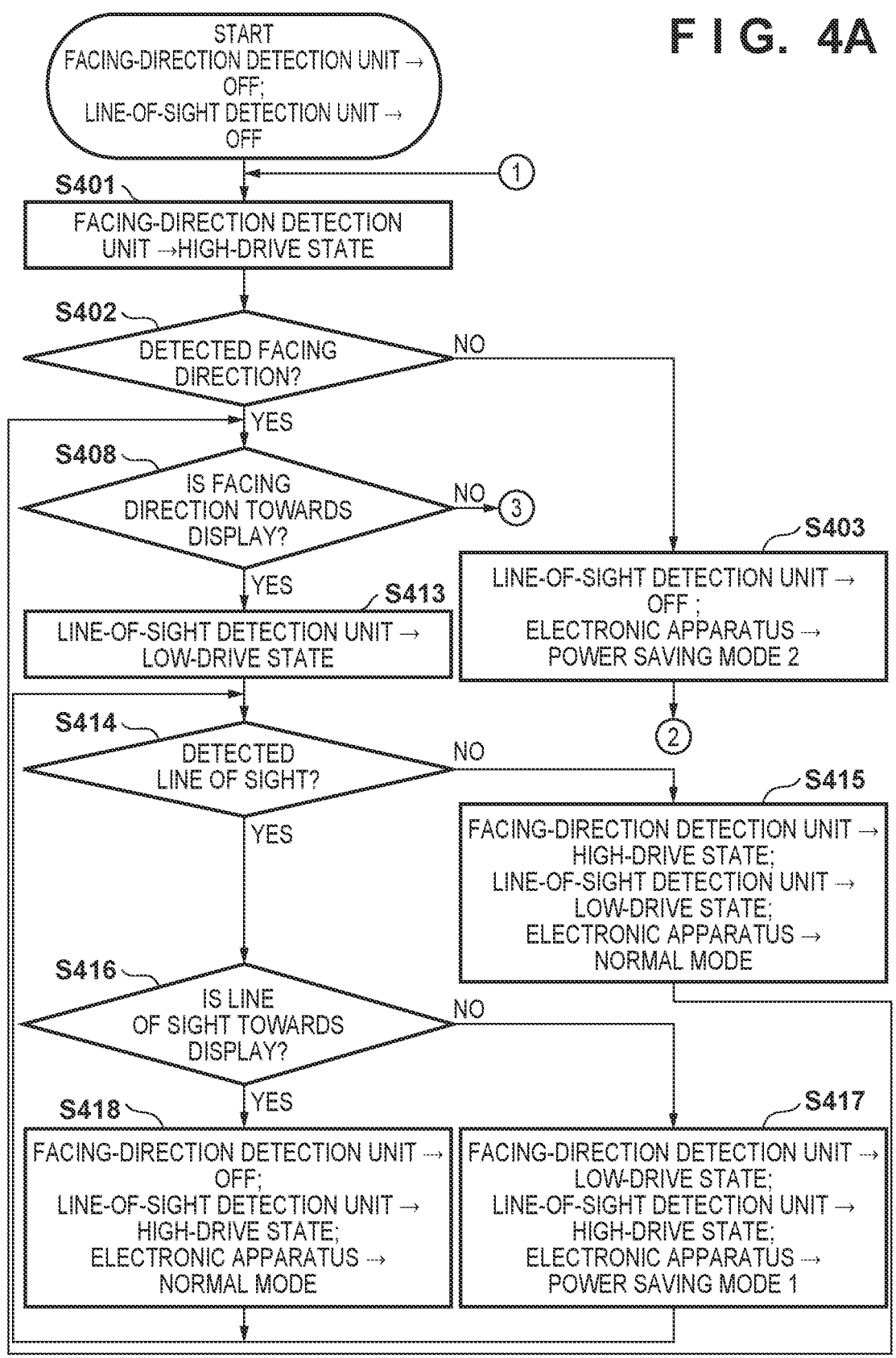
FIGS. 4A and 4B are flowcharts illustrating a processing procedure according to an exemplary embodiment.
Figure 4B:
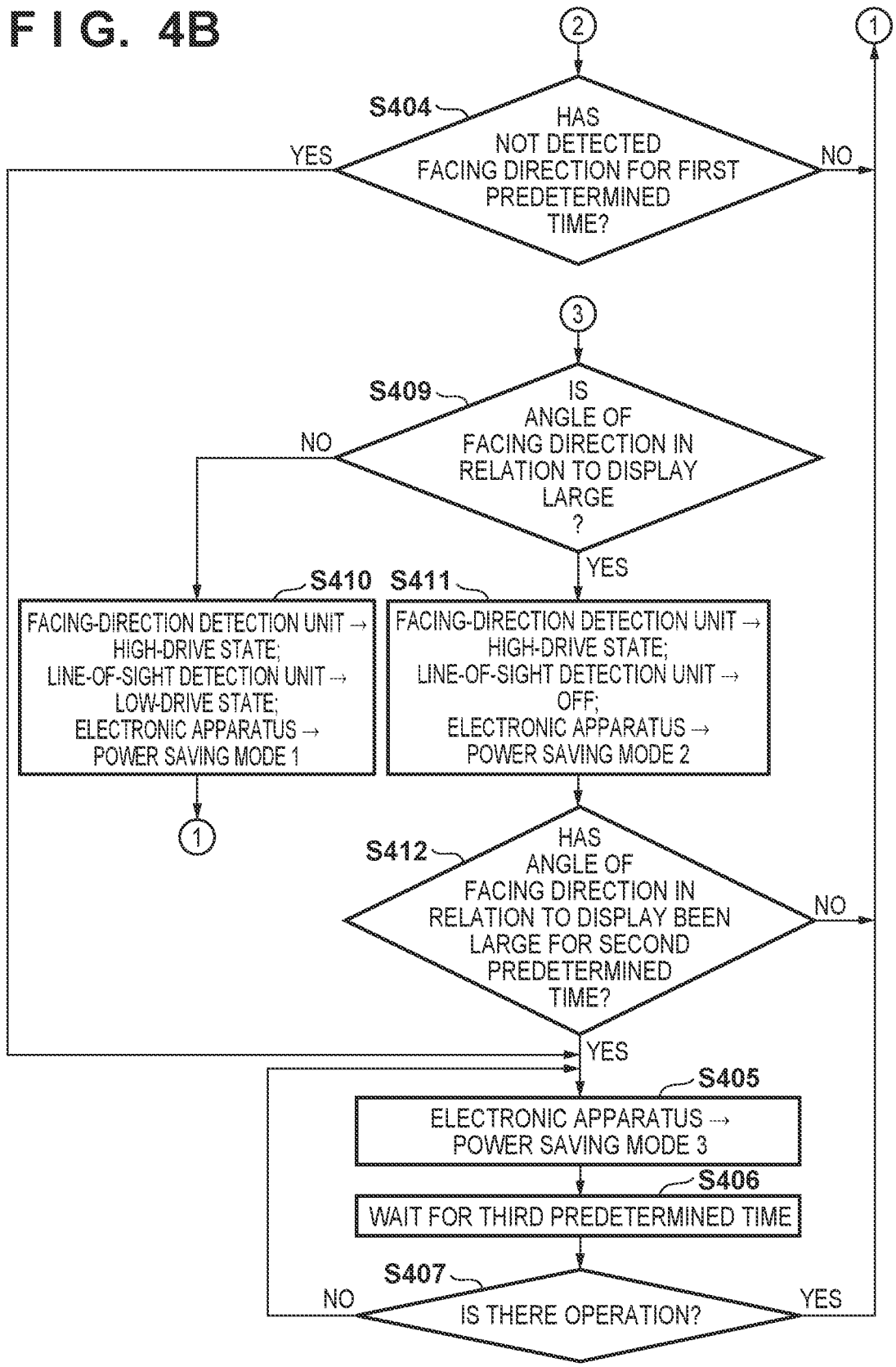

A method of controlling a drive state and power supply of each detection unit using the detection results of the facing-direction detection unit 161 and the line-of-sight detection unit 162 will now be described with reference to the flowcharts of FIGS. 4A and 4B, according to a first embodiment. The flowcharts of FIGS. 4A and 4B are a control during LV-displaying of step S301 in the flowchart of FIG. 3.

Before describing the processing illustrated in FIGS. 4A and 4B, power saving modes in the electronic apparatus 100 will be described. The electronic apparatus 100 has three modes for suppressing power consumption. The relationship between the amount of power consumption of each power saving mode including the normal mode in which the power consumption is not reduced is as follows.

Power saving mode 3<Power saving mode 2<Power saving mode 1<Normal mode

Details of each power saving mode are as follows.

Power saving mode 1: The image capturing interval (frame rate) of the image capturing unit 22 is set lower than in the normal mode. In other words, the frame rate of LV display is lower than in the normal mode. For example, when the frame rate of the image capturing unit 22 in the normal mode is 30 fps, the frame rate is lowered to, for example, 10 fps. The drive rate per unit time of the image capturing unit 22 as well as the A/D converter 22, the image processing unit 24, the display 28, and the like becomes lower, and power consumption is lower than in the normal mode.

Power saving mode 2: In addition to the above-described power saving mode 1, the driving of the display 28 and the EVF 29 is also stopped. When the display 28 is, for example, a liquid crystal display device, the power supply to the backlight is also turned off.

Power saving mode 3: The entire power supply of the electronic apparatus 100 is turned off and a sleep state is set. In order to return from the sleep state to the normal mode, a part of the operation unit 70 and a part of the system control unit 50 are set to an operable state in order to accept a recover instruction input by the user.

In view of the above, the processing of the system control unit 50 will be described with reference to the flowcharts of FIGS. 4A and 4B. This processing is realized by the system control unit 50 loading a program stored in the nonvolatile memory 56 into the system memory 52 and executing the program to thereby control each functional block. The flowcharts of FIGS. 4A and 4B are started when the electronic apparatus 100 is activated.

When the electronic apparatus 100 is activated, in step S401, the system control unit 50 performs control to transition the drive state of the facing-direction detection unit 161 into a high drive state with a short detection interval, and advances the process to step S402.

In step S402, the system control unit 50 determines whether the facing-direction determination unit 163 has detected the facing direction of the user. If it is determined that the facing direction has been detected, the system control unit 50 advances the process to step S408. If it is determined that the facing direction has not been detected, the system control unit 50 advances the process to step S403.

In step S403, the system control unit 50 performs control to turn off the power of the line-of-sight detection unit 162 and causes the electronic apparatus 100 to transition into the power saving mode 2. As described above, the power saving mode 2 encompasses the power saving mode 1, and is a process of turning off the driving of the display 28 and the EVF 29. Then, the system control unit 50 advances the process to step S404.

In step S404, the system control unit 50 determines whether a state in which the facing direction cannot be detected continues for a preset first predetermined time. When it is determined that the state in which the facing direction cannot be detected has continued for the first predetermined time, the system control unit 50 advances the process to step S405. When the state in which the facing direction cannot be detected is determined to not have reached the first predetermined time, the system control unit 50 returns the process to step S401.

In step S405, the system control unit 50 performs control to transition the electronic apparatus 100 into the power saving mode 3 in which the power is turned off to reduce the power consumption. Then, in step S406, the system control unit 50 performs control to wait for a third predetermined time, and advances the process to step S407. In step S407, the system control unit 50 determines whether an operation on the operation unit 70 has been accepted, and when the operation has been accepted, returns to the normal mode and returns to step S401. When it is determined that there is no operation from the operation unit 70, the system control unit 50 returns the process to step S405.

In step S408, the system control unit 50 determines whether the facing-direction determination unit 163 has determined that the facing direction of the user is towards the display 28.

When it is determined that the facing direction of the user is towards the display 2, the system control unit 50 advances the process to step S413, and when it is determined that the facing direction is not towards the display 2, advances the process to step S409.

In step S409, the system control unit 50 determines whether the angular difference in the facing direction of the user with respect to a line connecting the user and (the center of) the display 28 is greater than or equal to a predetermined value. If it is determined that the value is less than the predetermined value, the system control unit 50 advances the process to step S410, and if it is determined that the value is greater than or equal to the predetermined value, the process advances to step S411.

In step S410, the system control unit 50 performs control to transition the facing-direction detection unit 161 into a high drive state and to transition the drive state of the line-of-sight detection unit 162 into a low drive state in which the detection interval is large. The system control unit 50 performs control to transition to the low-framerate power saving mode 1, which causes the reading cycle of the signal of the image capturing unit 22 to be slower, and then returns the process to step S401.

In step S411, the system control unit 50 performs control to transition the facing-direction detection unit 161 into a high drive state and to turn the power supply of the line-of-sight detection unit 162 off. The system control unit 50 controls the electronic apparatus 100 to transition into the power saving mode 2, and then advances the process to step S412.

In step S412, the system control unit 50 determines whether a state in which the angle of the user's facing direction with respect to the display 28 is greater than the predetermined value has continued for a second predetermined time. If it is determined that a state in which the angle of the facing direction of the user with respect to the display 28 is greater than the predetermined value has continued for the second predetermined time, the system control unit 50 advances the processing to step S405, and if not, returns the processing to step S401.

In step S413, the system control unit 50 performs control to transition the line-of-sight detection unit 162 into the low drive state, and then advances the process to step S414.

In step S414, the system control unit 50 determines whether the line-of-sight determination unit 164 has detected the line of sight of the user. When it is determined that the line of sight of the user has been detected, the system control unit 50 advances the process to step S416, and when it is determined that the line of sight of the user has not been detected, the process advances to step S415.

In step S415, the system control unit 50 performs control to transition the facing-direction detection unit 161 into a high drive state and to transition the line-of-sight detection unit 162 into a low drive state. The system control unit 50 performs control for causing the electronic apparatus 100 to transition to the normal mode, which is a state at the time of activation. Then, the system control unit 50 returns the process to step S408.

In step S416, the line-of-sight determination unit 164 determines whether the line of sight of the user is towards the display 28. The system control unit 50 advances the processing to step S418 when it is determined that the line of sight of the user is towards the display 28, and advances the processing to step S417 when it is determined that the line of sight of the user is not towards the display.

In step S417, the system control unit 50 performs control to transition the facing-direction detection unit 161 into the low drive state and to transition the line-of-sight detection unit 162 into the high drive state. The system control unit 50 performs control for causing the electronic apparatus 100 to transition to the power saving mode 1. Then, the system control unit 50 returns the process to step S414.

In step S418, the system control unit 50 performs control to turn off the power supply of the facing-direction detection unit 161 and to transition the line-of-sight detection unit 162 into a high drive state. The system control unit 50 performs control for causing the electronic apparatus 100 to transition to the normal mode. Then, the system control unit 50 returns the process to step S414.

As described above, according to the first embodiment, the power supply or the drive state of each of the detection units is transitioned based on the detection results of the facing-direction detection unit 161 and the line-of-sight detection unit 162, so that the power consumption can be reduced compared with the case where the detection units are always driven.

In the above-described embodiment, the facing-direction detection unit 161 and the line-of-sight detection unit 162 each include an image capturing element, but an image capturing element can be shared for the facing direction and the line of sight detection. In this case, rather than the above-described fixing the image capturing cycle of the image capturing element to high-drive state and performing the facing direction detection processing and the line-of-sight detection processing every time an image capture is performed, the time interval at which the processing is performed can be set to a cycle corresponding to the "high-drive state" and the "low-drive state", so that the power consumption related to the calculation processing is optimized.

In addition, when the eye proximity detection unit 57 detects the proximity of the user's eye, that is, when it is estimated that the user is looking through the EVF, the distance between the image capturing element of each of the facing-direction detection unit 161 and the line-of-sight detection unit 162 and the face of the user is too small to detect the facing direction and the line of sight direction. When the user's eye proximity is detected by the eye proximity detection unit 57 as described above, the system control unit 50 can stop the driving of the facing-direction detection unit 161 and the line-of-sight detection unit 162 and drive the electronic apparatus in the normal mode (however, the display 28 may be put into a non-driving state).

Figure 5:
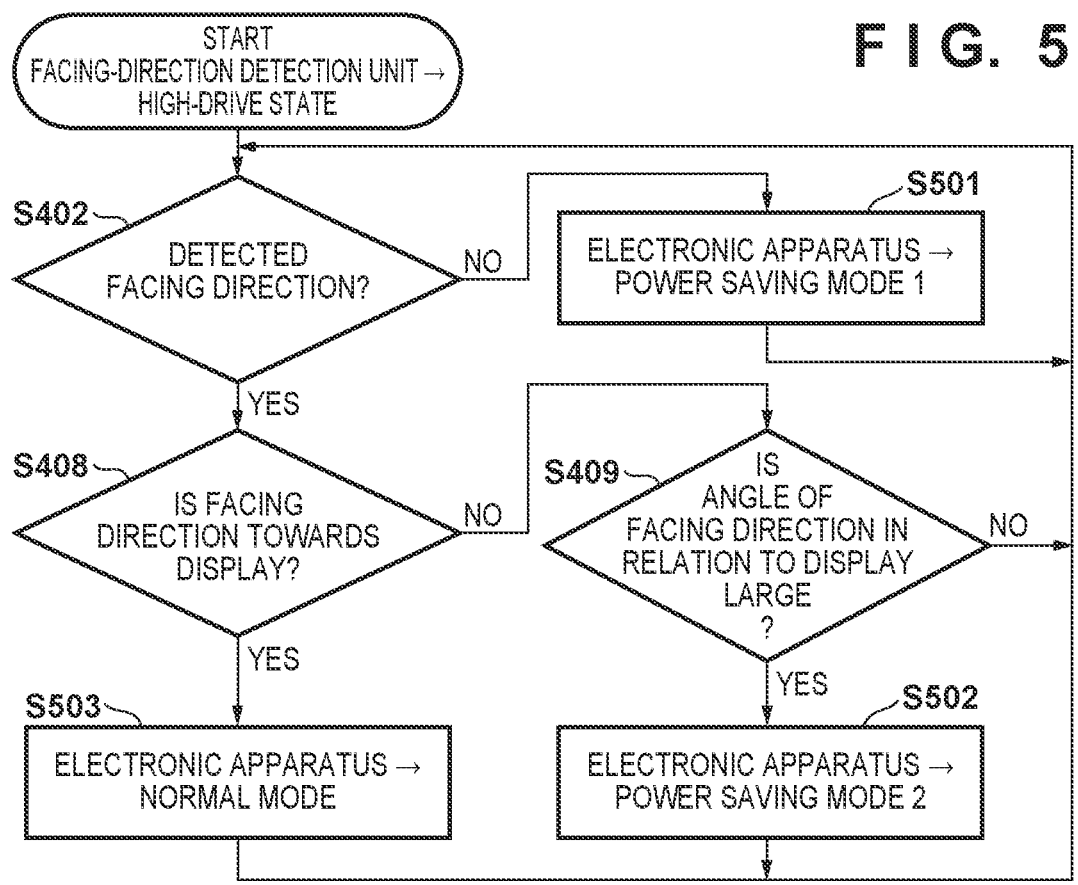
FIG. 5 is a flowchart illustrating a processing procedure according to an exemplary embodiment.

A second exemplary embodiment will now be described with reference to the flowchart of FIG. 5. In the second exemplary embodiment, a method of controlling the state of the electronic apparatus 100 based on the detection result of the facing-direction detection unit 161 will be described. The flowchart of FIG. 5 illustrates the processing during the LV-display of the step S301 in the flowchart of FIG. 3. Each process in FIG. 5 is realized by the system control unit 50 loading a program stored in the nonvolatile memory 56 into the system memory 52 and executing the program to thereby control each functional block. The flowchart of FIG. 5 is started when the electronic apparatus 100 is activated. The same steps as those in the flowcharts of FIGS. 4A and 4B are denoted by the same reference numbers, and the description thereof will be omitted. In the present flowchart, unlike the control of FIGS. 4A and 4B, the electronic apparatus 100 does not include the line-of-sight detection unit 162, but includes just the facing-direction detection unit 161. Since the device configuration is the same as that of FIG. 2 except that the line-of-sight detection unit 162 is not provided, a separate device configuration figure is not provided herein.

When the electronic apparatus 100 is activated, the system control unit 50 executes the same processing as step S402 in the flowcharts of FIGS. 4A and 4B, and advances the processing to step S408 or step S501.

Based on the above-described processing of step S408, the system control unit 50 advances the processing to step S503 when it is determined that facing direction of the user is towards the display 28, and advances the processing to step S409 when it is determined that the facing direction is not towards the display 28.

Based on the above-described processing of step S409, if it is determined that the value is less than the predetermined value, the system control unit 50 advances the process to step S402, and if it is determined that the value is greater than or equal to the predetermined value, the process advances to step S502.

In step S501, the system control unit 50 controls the electronic apparatus 100 to transition into the power saving mode 1, and then returns the process to step S402.

In step S502, the system control unit 50 controls the electronic apparatus 100 to transition into the power saving mode 2, and then returns the process to step S402.

In step S503, the system control unit 50 controls the electronic apparatus 100 to transition into the normal mode, and then returns the process to step S402.

As described above, according to the second exemplary embodiment, by transitioning the state of the electronic apparatus 100 based on the detection result of the facing-direction detection unit 161, it is possible to reduce the power consumption as compared with the case where the electronic apparatus is always used in the normal mode. Unlike the first embodiment, since the drive state of the detection unit is not changed, the obtained power-saving effect is smaller than that of the first embodiment, but since the number of components is reduced, the cost can be reduced.

A third exemplary embodiment will be described with reference to the flowchart of FIG. 6. In the third exemplary embodiment, a method of controlling the state of the electronic apparatus 100 based on the detection result of face detection unit 161 will be described. The flowchart of FIG. 6 illustrates the processing during the LV-display of the step S301 in the flowchart of FIG. 3.

Figure 6:
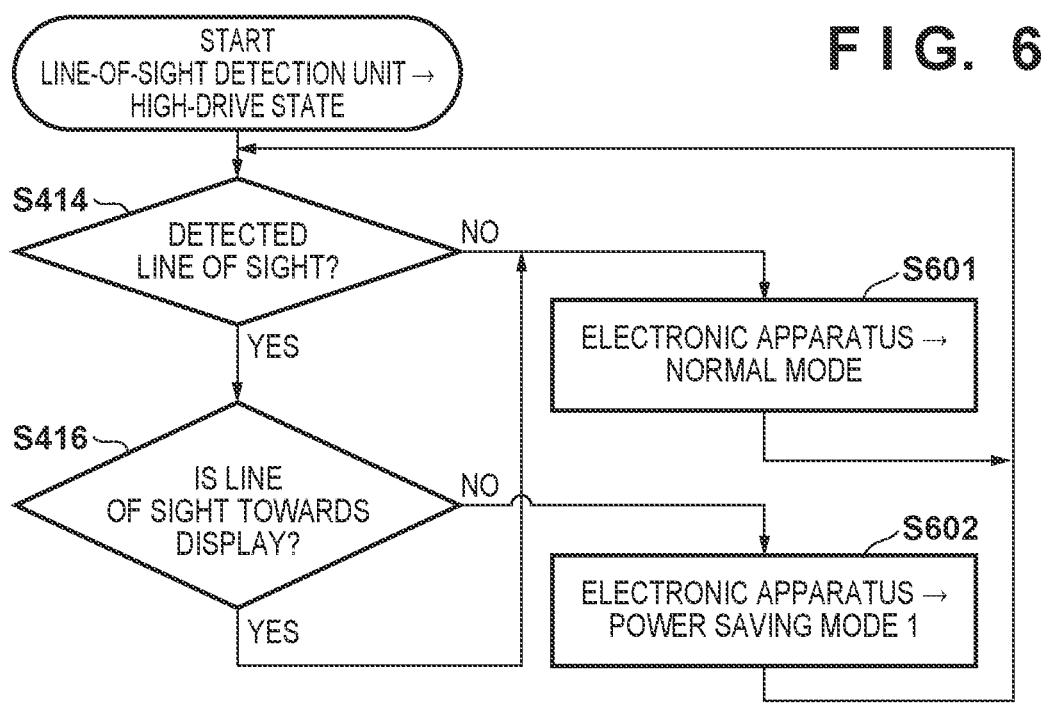
FIG. 6 is a flowchart illustrating a processing procedure according to an exemplary embodiment.

Each process in the flowchart of FIG. 6 is realized by the system control unit 50 loading a program stored in the nonvolatile memory 56 into the system memory 52 and executing the program to thereby control each functional block. The flowchart of FIG. 6 is started when the electronic apparatus 100 is activated. The same steps as those in the flowcharts of FIGS. 4A and 4B are denoted by the same reference numbers, and the description thereof will be omitted. In the present flowchart, unlike the control of FIGS. 4A and 4B, the electronic apparatus 100 does not include the line-of-sight detection unit 161, but includes just the facing-direction detection unit 162. Since the device configuration is the same as that of FIG. 2 except that the facing-direction detection unit 161 is not provided, a separate device configuration figure is not provided.

When the electronic apparatus 100 is activated, based on the above-described processing of step S414, when it is determined that the line of sight of the user has been detected, the system control unit 50 advances the process to step S416, and when it is determined that the line of sight of the user has not been detected, the process advances to step S601.

Based on the above-described processing of step S416, the system control unit 50 advances the processing to step S602 when it is determined that the line of sight of the user is towards the display 28, and advances the processing to step S601 when it is determined that the line of sight of the user is not towards the display.

In step S601, the system control unit 50 controls the electronic apparatus 100 to transition into the normal mode, and then returns the process to step S414.

In step S602, the system control unit 50 controls the electronic apparatus 100 to transition into the power saving mode 1, and then returns the process to step S414.

As described above, according to the third exemplary embodiment, by transitioning the state of the electronic apparatus 100 based on the detection result of the line-of-sight detection unit 162, it is possible to reduce the power consumption as compared with the case where the electronic apparatus is always used in the normal mode. Similar to the second exemplary embodiment, since the drive state of the detection unit is not changed, the obtained power-saving effect is smaller than that of the first exemplary embodiment, but since the number of components is reduced, the cost can be reduced.

A fourth exemplary embodiment will now be described. In the fourth exemplary embodiment, a method of controlling the power source of the facing-direction detection unit 161 and the line-of-sight detection unit 162 based on the state of the electronic apparatus 100 will be described. Since the device configuration is the same as that of FIG. 2, a description thereof is omitted.

In the fourth exemplary embodiment, the system control unit 50 performs control to turn off the power source of the facing-direction detection unit 161 and the line-of-sight detection unit 162 when the electronic apparatus 100 is in state where a setting can be changed during the LV display, a state where a captured moving image is displayed or played back, or a menu mode state. Except for in these states, the facing-direction detection unit 161 and the line-of-sight detection unit 162 are set to a drive state, and the same processing as in the first exemplary embodiment is performed based on the detection results.

As described above, according to the fourth exemplary embodiment, by controlling the power source of the facing-direction detection unit 161 and the line-of-sight detection unit 162 to be off based on the state of the electronic apparatus 100, it is possible to reduce the power consumption as compared with the case where the detection units are always driven.

A fifth exemplary embodiment will be described. In the fifth exemplary embodiment, a method of preventing the electronic apparatus 100 from transitioning into power saving mode based on the detection result of the line-of-sight detection unit 162 will be described. It is assumed that the electronic apparatus 100 has control for transitioning into a state in which power consumption is smaller than at the time of startup when an operation on an operation member is not performed for a predetermined period of time.

The system control unit 50, when the line-of-sight determination unit 164 determines that the line of sight is towards the electronic apparatus 100 when a state in which the electronic apparatus 100 has not been operated has proceeded for a predetermined period of time, maintains the state at the time of activation, and when the line-of-sight determination unit 164 determines that the line of sight is not towards the electronic apparatus 100, causes a transition into a power saving mode (any one of the power saving modes 1 to 3) selected in advance by the user.

As described above, according to the fifth exemplary embodiment, by controlling the state of the electronic apparatus 100 based on the detection state of the line-of-sight detection unit 162, it is possible to prevent the electronic apparatus 100 from transitioning into a state contrary to the user's intention.

While exemplary embodiments have been described above, these embodiments are not seen to be limiting, and various modifications and changes can be made within the scope of the embodiments. For example, even if the facing direction is not detected, the electronic apparatus 100 can be transitioned into the normal mode as long as the electronic apparatus 100 can detect that the line of sight is towards the electronic apparatus 100. In FIGS. 4A and 4B, the output result of the line-of-sight detection unit 162 is referenced based on the output of the facing-direction detection unit 161, but the output result of the facing-direction detection unit 161 can be referenced based on the output of the line-of-sight detection unit 162. In FIG. 5 and FIG. 6, while just the state transition of the electronic apparatus 100 is mentioned, but the drive state and the power supply of the facing-direction detection unit 161 or the line-of-sight detection unit 162 can be transitioned. The content of control in the power saving modes 1 to 3 can each be changed to different control.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2021-196466, filed Dec. 2, 2021, which is hereby incorporated by reference herein in its entirety.

What is claimed is:

1. An electronic apparatus including a display, comprising:
   at least one processor which functions as:
   a facing-direction detection unit configured to detect a direction of a facing direction representing a direction in which a user of the electronic apparatus is facing;
   a setting unit configured to set the electronic apparatus to one of multiple modes, including a normal mode, a first power saving mode in which the power consumption of the electronic apparatus is lower than that of the normal mode, and a second power saving mode in which the power consumption of the electronic apparatus is lower than that of the first power saving mode, based on detection results of the facing-direction detection unit;
   wherein the setting unit is configured to:
      set the electronic apparatus to the second power saving mode, in a case where the facing direction of the user is not detected by the facing-direction detection unit;
      set the electronic apparatus to the first power saving mode, in a case where the facing direction of the user detected by the facing-direction detection unit is not towards the display and the facing direction of the user detected by the facing-direction detection unit is less than or equal to a predetermined angle away from a direction towards the display;
      set the electronic apparatus to the second power saving mode, in a case where the facing direction of the user detected by the facing-direction detection unit is not towards the display and the facing direction is greater than the predetermined angle away from the direction towards the display; and
      set the electronic apparatus to the normal power saving mode, in a case where the facing direction of the user detected by the facing-direction detection unit is towards the display.

2. The apparatus according to claim 1, further comprising:
   an image capturing circuit,
   wherein
   the first power saving mode where a cycle for image capturing by the image capturing circuit is made longer than the normal mode;
   the second power saving mode where, in addition to the operations performed during the first power saving mode, power to the display is turned off; and
   a third power saving mode where the electronic apparatus enters a sleep state.

3. The apparatus according to claim 1, wherein the at least one processor further functions as a line-of-sight detection unit configured to detect a line of sight direction of the user,
   wherein the setting unit is further configured to:
   set the electronic apparatus to the normal mode, in a case where the facing direction of the user detected by the facing-direction detection unit is towards the display and the direction of the line of sight is not detected by the line-of-sight detection unit;
   set the electronic apparatus to the first power saving mode, in a case where the facing direction of the user detected by the facing-direction detection unit is towards the display and the direction of the line of sight detected by the line-of-sight detection unit is not towards the display; and set the electronic apparatus to the normal mode, in a case where the facing direction of the user detected by the facing-direction detection unit is towards the display and the direction of the line of sight detected by the line-of-sight detection unit is towards the display.

4. The apparatus according to claim 2, wherein the setting unit is further configured to set the electronic apparatus to the third power saving mode, in a case where operation in the second power saving mode continues for a predetermined time.

5. The apparatus according to claim 3, wherein the at least one processor further functions as a control unit configured to execute a mode set by the setting unit, wherein the control unit is configured to:

when executing the first power saving mode, set a cycle for facing direction detection by the facing-direction detection unit to a higher cycle out of two preset stages, and set a cycle to a lower cycle out of two preset stages for line of sight detection by the line-of-sight detection unit;

when executing the second power saving mode, set the cycle for facing direction detection by the facing-direction detection unit to a higher cycle out of the two preset stages, and stop the line-of-sight detection unit;

when executing the normal mode in a state in which the line of sight is not detected by the line-of-sight detection unit, set the cycle of the facing direction detection by the facing-direction detection unit to the higher cycle, and sets the line-of-sight detection unit to the lower cycle; and when executing the normal mode in a state in which the line of sight detected by the line-of-sight detection unit is towards the display, stop the facing-direction detection unit; and set the line-of-sight detection unit to the higher cycle.

6. A method of controlling an electronic apparatus including a display, the method comprising:

detecting a facing direction representing a direction in which a user of the electronic apparatus is facing;

setting the electronic apparatus to one of multiple modes, including a normal mode, a first power saving mode in which the power consumption of the electronic apparatus is lower than that of the normal mode, and a second power saving mode in which the power consumption of the electronic apparatus is lower than that of the first power saving mode, based on detection results of the facing direction;

wherein the setting is configured to:

set the electronic apparatus to the second power saving mode, in a case where the facing direction of the user is not detected;

set the electronic apparatus to the first power saving mode, in a case where the detected facing direction of the user is not towards the display and the detected facing direction of the user is less than or equal to a predetermined angle away from a direction towards the display;

set the electronic apparatus to the second power saving mode, in a case where the detected facing direction of the user is not towards the display and the facing direction is greater than the predetermined angle away from the direction towards the display; and set the electronic apparatus to the normal power saving mode, in a case where the detected facing direction of the user is towards the display.

7. A non-transitory computer-readable storage medium storing a program which, when read and executed by a computer, causes the computer to execute a method of controlling an electronic apparatus including a display, the method comprising:

detecting a direction of a facing direction representing a direction in which a user of the electronic apparatus is facing;

setting the electronic apparatus to one of multiple modes, including a normal mode, a first power saving mode in which the power consumption of the electronic apparatus is lower than that of the normal mode, and a second power saving mode in which the power consumption of the electronic apparatus is lower than that of the first power saving mode, based on detection results of the facing direction;

wherein the setting the electronic apparatus to one of multiple modes comprises:

setting the electronic apparatus to the second power saving mode, in a case where the facing direction of the user is not detected;

setting the electronic apparatus to the first power saving mode, in a case where the detected facing direction of the user is not towards the display and the detected facing direction of the user is less than or equal to a predetermined angle away from a direction towards the display;

setting the electronic apparatus to the second power saving mode, in a case where the detected facing direction of the user is not towards the display and the facing direction is greater than the predetermined angle away from the direction towards the display; and setting the electronic apparatus to the normal power saving mode, in a case where the detected facing direction of the user is towards the display.

* * * * *